United States Patent [19]

Berger

[11] 4,384,699

[45] May 24, 1983

[54] DEVICE FOR LOAD CARRIER SUPPORTING LEGS

[76] Inventor: Gunvald M. S. Berger, Helmfeltsgatan 4A, S-211 48 Malmö, Sweden

[21] Appl. No.: 202,440

[22] PCT Filed: Jan. 10, 1980

[86] PCT No.: PCT/SE80/00010

§ 371 Date: Sep. 11, 1980

§ 102(e) Date: Sep. 11, 1980

[87] PCT Pub. No.: WO80/01476

PCT Pub. Date: Jul. 24, 1980

[30] Foreign Application Priority Data

Jan. 11, 1979 [SE] Sweden ............................ 7900268

[51] Int. Cl.³ .................................. F16M 13/00
[52] U.S. Cl. ................................ 248/545; 248/188.8; 248/357
[58] Field of Search .............. 248/156, 357, 356, 545, 248/530, 533, 188.8, 407; 52/155; 98/56, 58; 405/283

[56] References Cited

U.S. PATENT DOCUMENTS

| 41,427 | 2/1864 | Elbreg ............................... 98/58 |
| 787,267 | 4/1905 | Bragg ............................... 98/58 |
| 872,335 | 12/1907 | Foster ............................... 248/407 |
| 1,719,695 | 7/1929 | Ferguson ............................ 248/156 |
| 2,047,346 | 7/1936 | Weston ............................. 248/188.8 |
| 2,720,249 | 10/1955 | Peterson ............................ 248/156 |
| 2,781,716 | 2/1957 | Moran ............................... 98/58 |
| 2,919,514 | 1/1960 | King et al. . | |
| 3,007,661 | 11/1961 | Knopf ............................... 248/545 |
| 3,318,560 | 5/1967 | Garrette, Jr. et al. ............. 248/545 |
| 3,342,444 | 9/1967 | Nelson ............................. 248/530 |
| 3,535,071 | 10/1970 | Bore ............................... 248/357 |

FOREIGN PATENT DOCUMENTS

| 1006796 | 4/1957 | Fed. Rep. of Germany . |
| 187063 | 3/1961 | Sweden . |
| 552833 | 4/1943 | United Kingdom ............. 248/356 |
| 852076 | 10/1960 | United Kingdom . |

Primary Examiner—Victor N. Sakran
Attorney, Agent, or Firm—Wood, Dalton, Phillips, Mason & Rowe

[57] ABSTRACT

In the wall of a supporting leg, which is formed as a tube at least in its downwardly open lower portion, a hole (11) has been formed. A sloping plate (10) inside the leg forces dirt, snow, etc. through this hole after penetrating into said lower portion of the leg and counteracts the weakening of the strength caused by the hole. A support plate (4) displaceable along the leg is lockable by a locking means (6) in a position wherein the plate is at a distance from a lower end of the leg resting on a substantially horizontal surface or to a position wherein the plate is lower than or substantially in the same horizontal plane as the lower end of the leg and there is resting on the substantially horizontal surface. The lower edges of the leg suitably are provided with means (3) for increasing the grip with the ground.

4 Claims, 1 Drawing Figure

U.S. Patent   May 24, 1983   4,384,699
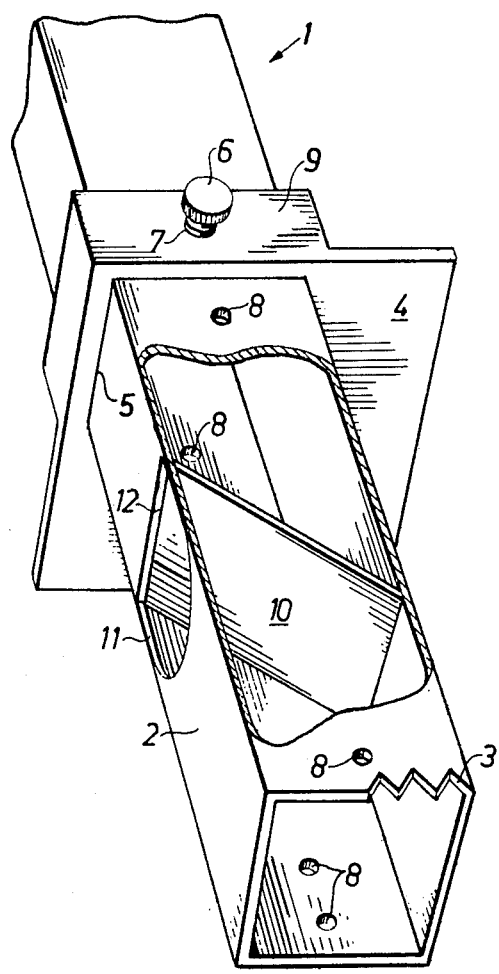

DEVICE FOR LOAD CARRIER SUPPORTING LEGS

FIELD OF THE INVENTION

The present invention relates to a device for load carrier supporting legs.

PRIOR ART

When a conventional load carrier, such as a container or an exchangeable platform, is removed from a lorry and placed on the ground via supporting legs the lower parts of these legs often destroy the ground if it consists of damageable material, such as asphalt, especially if the carrier is heavily loaded and if the lower parts of the legs are provided with means for increasing the grip between the legs and a slippery or icy ground. If the legs consist of tubular profiles, such as square tubes, it is also common that clay, dirt or snow penetrates into the legs when they are placed on a ground consisting of such material. The material is difficult to remove from the legs and makes the legs heavier and more difficult to handle when they are swung upwardly and removed, for instance.

DESCRIPTION OF THE INVENTION

It is an object of the invention to provide a device for a load carrier supporting leg which solves the above described problems in a simple and economic way.

This object is fulfilled by giving the invention the characteristics described in the claims.

DESCRIPTION OF THE DRAWING FIGURES

A preferred embodiment of the invention will now be described in connection with the enclosed drawing, the only FIGURE of which is a perspective view, with certain parts cut away, of the device according to the invention.

DESCRIPTION OF PREFERRED EMBODIMENT

A supporting leg 1 which together with other supporting legs supports a load carrier (not shown) on the ground includes, at least in its lower portion, a square tube 2. The lower end of the tube has four edges which engage the ground and prevent the load carrier from sliding on the ground if slippery or icy which may happen if the lorry is jarred against the carrier during loading or unloading or if the ground is not horizontal. The lower edges of the tube 2 may be formed to increase the grip with the ground. Such a form is indicated at 3 in the FIGURE.

A support plate 4 with a hole 5 therethrough, which is insignificantly greater than the outer cross section of the tube, is displaceable along the tube 2 and can be locked thereto in any of many positions by means of a locking pin 6 which is longer than the distance between the opposed side walls of the tube. During locking the pin 6 is inserted through opposed holes 7 in upstanding flanges 9 on the support plate 4 and through opposed holes 8 in two opposed walls of the tube 2, whereafter the locking pin is locked in this position in a suitable manner.

When the load carrier is placed on an icy ground, for instance, or when the leg does not carry the load carrier, the support plate is not needed and may be removed from the leg if desired. When the carrier is placed on earth, sand or clay, for instance, the plate 4 is suitably locked to the tube 2 so that the bottom surface of the plate will be at a distance of a few centimeters from the lower end of the tube. The lower edges of the tube will then engage the ground and prevent the leg from sliding thereon. In this position the plate 4 will prevent the leg from sinking through the ground a distance which is longer than the distance between the lower edges of the tube and the bottom surface of the support plate.

When the load carrier is placed on a damageable ground, such as asphalt, the support plate 4 is locked to the tube 2 so that the bottom surface of the plate will be in the same horizontal plane as the lower edges of the tube or somewhat lower than these edges. Thus, the contact surface of the leg against the ground will be great and the risk of damages of the ground will be minimized.

When the load carrier is placed in deep snow, for instance, the support plate 4 may be locked in the position shown in the FIGURE.

In order that dirt, sand, clay, snow, etc., which penetrate into the tube 2 when the load carrier is placed on the ground consisting of such material, shall not remain in the tube 2, a guiding plate 10 has been welded to the inner walls of the tube as shown in the FIGURE. The width of the plate 10 is the same as the distance between two opposed inner walls of the tube and the length thereof is somewhat greater than this distance. The upper edge of the guiding plate is located immediately above a hole 11 in one side of the tube 2. This hole weakens the leg but since the guiding plate 10 stiffens it the strength of the leg will be substantially unchanged. The other edge of the guiding plate 10 is located relatively near the lower end of the tube. Therefore, when a great amount of material penetrates into the tube 2 it will be pressed against the sloped guiding plate 10 which will direct the material out from the hole 11.

An embodiment of the invention has been described above. It should be understood, however, that the invention is not limited to this embodiment and that many modifications and other embodiments thereof are possible within the frame of the invention. Thus—instead of being a square tube—the leg may consist of a tube having circular cross section or may consist of a beam having a section in the form of an I or an U. The form and size of the support plate can also be modified if desired.

Accordingly, the invention is limited only to that which is stated in the following claims.

I claim:

1. A leg construction for a pallet-like carrier or the like having a plurality of such legs, said leg construction comprising:
   an elongated tube (2) having opposed ends, at least one of which is open;
   a supporting plate (4) having an opening (5) slidably receiving said tube and movable relative to the tube between first positions between the ends of said tube and a second position wherein a downwardly facing supporting surface of said support plate is at least generally at the open one of said tube ends;
   locking means (6,7,8) for locking said support plate in said position;
   means adjacent said tube open end for expelling foreign material entering said tube open end from the interior of said tube, said expelling means comprise an exit opening in a side of said tube; and a baffle (10) within said tube oriented to direct foreign material entering said tube open end to said exit opening.

2. The leg construction of claim 1 wherein said supporting plate includes a flange (9) about said opening and oppositely of said support surface, and said locking means comprises alignable holes (7,8) in said flange and said tube and a locking pin (6) receivable in aligned ones of said holes.

3. The leg construction of claim 1 wherein said tube open end includes an uneven edge (3) to grip the underlying terrain.

4. The leg construction of claim 1 wherein said baffle is a plate welded to the inner wall of said tube and further serves to stiffen said tube in the area of said exit opening.

* * * * *